United States Patent
Swanson

(10) Patent No.: US 7,152,368 B2
(45) Date of Patent: Dec. 26, 2006

(54) GARDEN TRELLIS

(76) Inventor: Dwight V. Swanson, 3080 W. Madison, Hart, MI (US) 49420

( * ) Notice: Subject to any disclaimer, the term of this patent is extended or adjusted under 35 U.S.C. 154(b) by 0 days.

(21) Appl. No.: 10/358,367

(22) Filed: Feb. 4, 2003

(65) Prior Publication Data

US 2004/0148853 A1  Aug. 5, 2004

(51) Int. Cl.
- A01G 9/12 (2006.01)
- E04H 17/00 (2006.01)
- E04B 1/18 (2006.01)
- A63H 33/08 (2006.01)

(52) U.S. Cl. ............... 47/70; 47/46; 47/44; 256/65.05; 256/47; 52/633; 52/668; 403/329; 403/326; 446/124; 211/126

(58) Field of Classification Search ............... 47/70, 47/46, 4, 44, 45, 47; 248/27.8, 351; 256/65.04, 256/65.05, 65.06, 20, 21, 22, 32, 34, 41, 256/47, 65.02, 48; D25/38, 100, 101, 156; 52/633, 668, 665, 660; 119/474, 461; 403/329, 403/326; 24/339; 446/108, 111, 116, 117, 446/120, 124; 211/126.12, 126.11, 133.2; A01G 17/06, A01G 17/04

See application file for complete search history.

(56) References Cited

U.S. PATENT DOCUMENTS

| | | | |
|---|---|---|---|
| 317,939 A | 5/1885 | Halfpenny | |
| 432,305 A * | 7/1890 | Foley | 248/229.26 |
| 577,220 A * | 2/1897 | Whitehead | 294/19.1 |
| 1,336,580 A | 4/1920 | Parr | |
| D89,038 S | 1/1933 | Gass | |
| 1,941,517 A * | 1/1934 | Tincu | 47/47 |
| 2,083,678 A * | 6/1937 | Wilson | 47/47 |
| 2,246,441 A * | 6/1941 | Hurlbut | 248/27.8 |
| 2,651,502 A * | 9/1953 | Carvelo et al. | 256/33 |
| 2,696,963 A * | 12/1954 | Shepherd | 248/229.15 |
| 3,014,700 A * | 12/1961 | May | 256/33 |
| 3,264,783 A * | 8/1966 | Bayliss | 47/45 |
| 4,022,436 A | 5/1977 | Thomas | |
| 4,707,892 A * | 11/1987 | Nelson | 24/336 |
| 4,774,792 A * | 10/1988 | Ballance | 52/285.2 |
| 5,518,333 A * | 5/1996 | Cienkus et al. | 403/169 |
| 5,544,446 A * | 8/1996 | Benson, Jr. | 47/45 |
| 5,609,327 A | 3/1997 | Amidon | |
| 5,640,802 A | 6/1997 | Elliott | |
| 5,642,557 A * | 7/1997 | Clews | 24/339 |
| 5,711,107 A | 1/1998 | Louisiana | |
| 5,758,868 A * | 6/1998 | Shea | 256/12.5 |
| D402,041 S * | 12/1998 | Hill | D25/60 |
| D403,435 S * | 12/1998 | Hill, Sr. | D25/38 |
| 5,913,477 A | 6/1999 | Dean | |

(Continued)

FOREIGN PATENT DOCUMENTS

DE   3933198 A1 *  2/1989

(Continued)

Primary Examiner—Andrea M. Valenti
(74) Attorney, Agent, or Firm—Price, Heneveld, Cooper, DeWitt & Litton, LLP

(57) ABSTRACT

A trellis assembly including a first trellis section having a plurality of vertical rods connected to at least one horizontal rod and a second trellis section having a plurality of connected horizontal and vertical rods. The second trellis section includes a plurality of tubes connected to an outside of the vertical rods at upper ends thereof configured to accept lower ends of the vertical rods of the first trellis section to connect the first trellis section to the second trellis section.

10 Claims, 4 Drawing Sheets

U.S. PATENT DOCUMENTS

| | | |
|---|---|---|
| 6,182,948 B1 | 2/2001 | Brandeis |
| D440,321 S * | 4/2001 | Jones ........................ D25/100 |
| 6,481,697 B1 * | 11/2002 | Brown ........................ 256/64 |
| 6,691,382 B1 * | 2/2004 | Su .............................. 24/545 |

FOREIGN PATENT DOCUMENTS

GB  2192663  *  1/1988

* cited by examiner

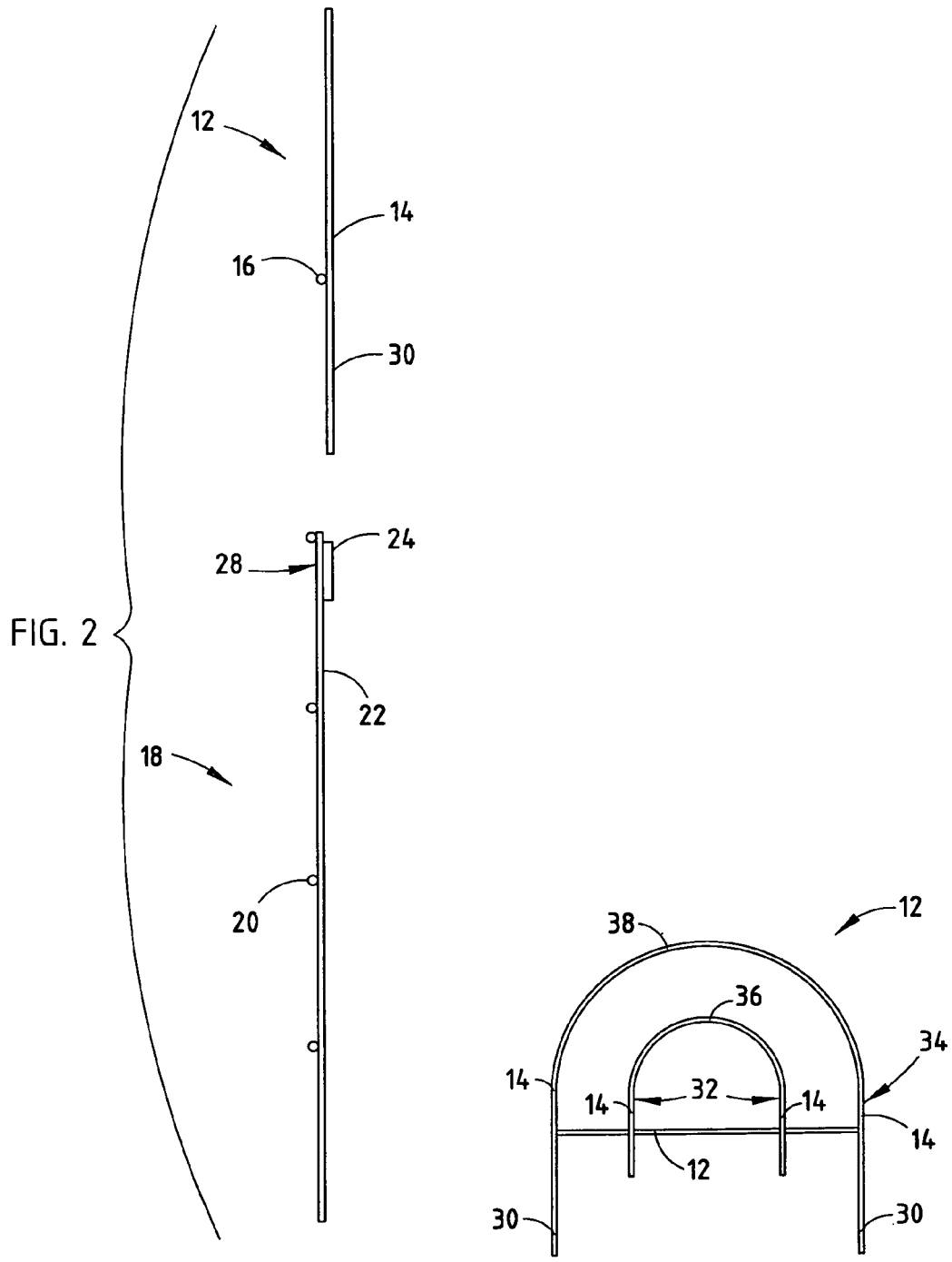

GARDEN TRELLIS

BACKGROUND OF THE INVENTION

The present invention relates to garden trellises, and in particular to a reconfigurable garden trellis.

Garden trellises are typically used as a screen or a support for climbing plants. Trellises can also be used as a decorative fence or border for gardens, sidewalks, landscaping, etc. Heretofore, garden trellises have typically comprised a frame of latticework having a fixed design. The garden trellises typically included a plurality of frames that are placed partially into the ground generally in a parallel manner. However, the garden trellises typically had a set height and all the frames of garden trellises were substantially identical.

Accordingly, a garden trellis solving the aforementioned disadvantages and having the aforementioned advantages is desired.

SUMMARY OF THE INVENTION

One aspect of the present invention is to provide a trellis assembly including a first trellis section having a plurality of vertical rods connected to at least one horizontal rod and a second trellis section having a plurality of connected horizontal and vertical rods. The second trellis section includes a plurality of tubes connected to an outside of the vertical rods at upper ends thereof configured to accept lower ends of the vertical rods of the first trellis section to connect the first trellis section to the second trellis section.

Another aspect of the present invention is to provide a method of building a trellis. The method includes the step of providing a first trellis section and a plurality of second trellis sections, with the second trellis sections including a plurality of tubes connected thereto at upper ends thereof and the first trellis section including at least one pair of vertical rods. The method also includes the steps of inserting a first one of the at least one pair of vertical rods of the first trellis section into one of the tubes of a first one of the second trellis sections and inserting a second one of the at least one pair of vertical rods of the first trellis section into one of the tubes of a second one of the second trellis sections.

These and other features, advantages, and objects of the present invention will be further understood and appreciated by those skilled in the art by reference to the following specification, claims and appended drawings.

BRIEF DESCRIPTION OF THE DRAWINGS

FIG. 2 is an exploded side view of the trellis assembly embodying the present invention.

FIG. 3 is a front view of a first embodiment of an upper trellis section of the trellis assembly.

DETAILED DESCRIPTION OF THE PREFERRED EMBODIMENTS

Figure 1:
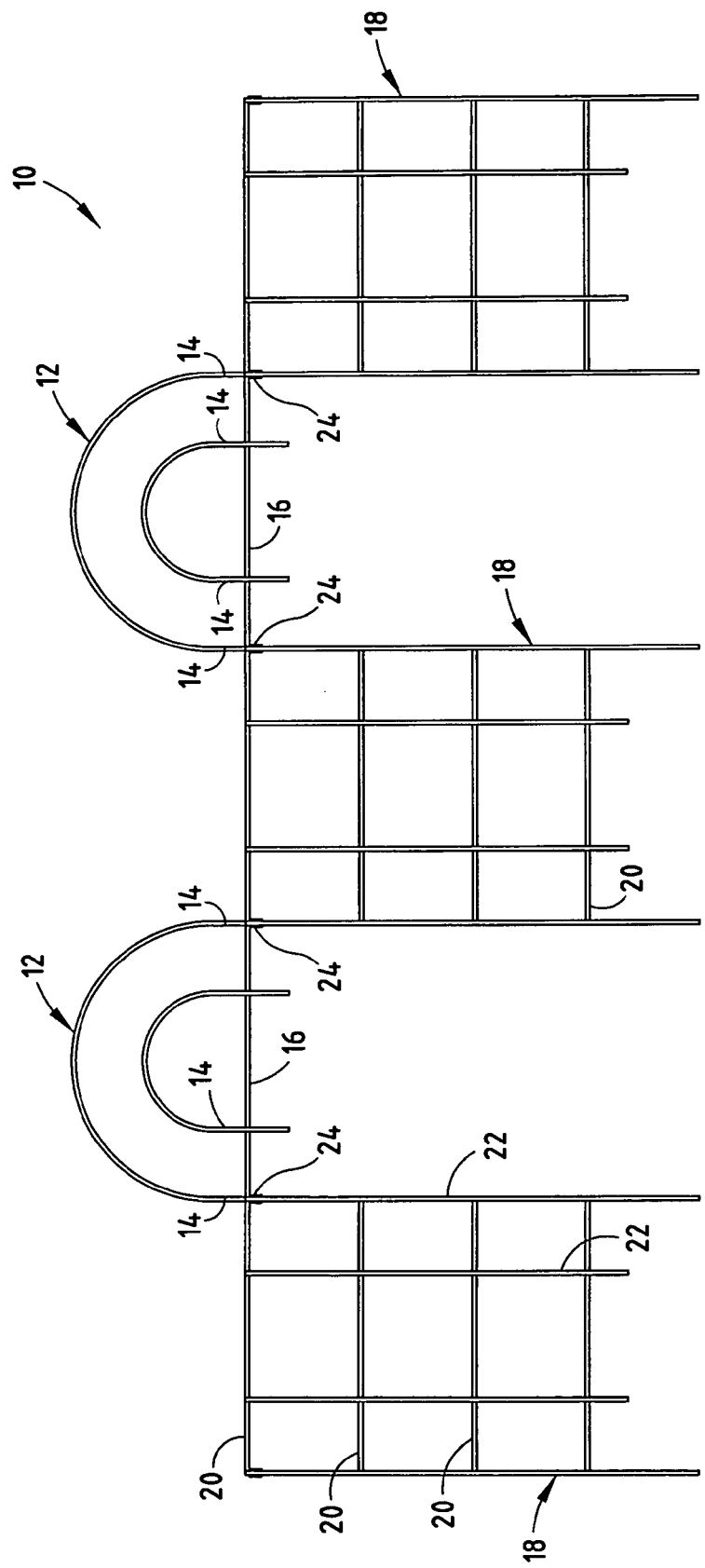
FIG. 1 is a front view of a trellis assembly embodying the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIG. 1) generally designates a trellis assembly embodying the present invention. In the illustrated example, the trellis assembly 10 comprises an upper trellis section 12 having a plurality of vertical rods 14 connected to at least one horizontal rod 16 and a lower trellis section 18 having a plurality of connected horizontal rods 20 and vertical rods 22. As illustrated in FIG. 2, the lower trellis section 18 includes a plurality of tubes 24 connected to an outside of the vertical rods 22 at upper ends 28 thereof configured to accept lower ends 30 of the vertical rods 14 of the upper trellis section 12 to connect the upper trellis section 12 to the lower trellis section 18.

In the illustrated example, the upper trellis section 12 (FIG. 3) is the top trellis section used in the trellis assembly 10. The upper trellis section 12 includes one horizontal rod 16, a pair 32 of inside vertical rods 14 and a pair 34 of outside vertical rods 14. The pair 32 of inside vertical rods 14 are connected to each other by a first curved rod 36 and the pair 34 of outside vertical rods 14 are connected to each other by a second curved rod 38. Preferably, the pair 34 of outside vertical rods 14 are longer than the pair 32 of inside vertical rods 14. The upper trellis section 12 is configured to be connected to one or more lower trellis sections 18.

Figure 4:
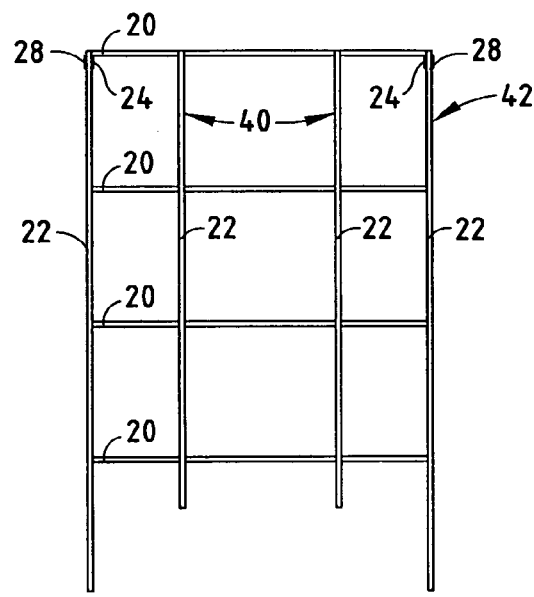
FIG. 4 is a front view of a lower trellis section of the trellis assembly.
Figure 5:
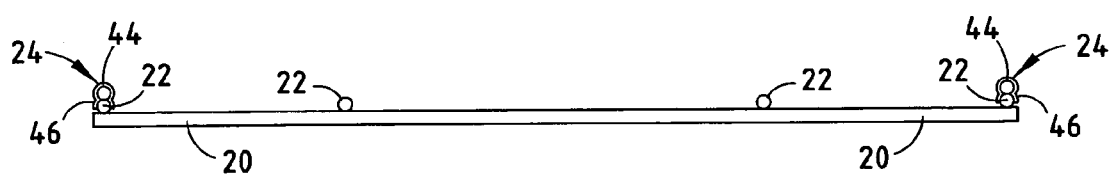
FIG. 5 is a top view of the lower trellis section of the trellis assembly.

The illustrated lower trellis section 18 (FIGS. 4 and 5) is a mid level or bottom trellis section used in the trellis assembly 10. The lower trellis section 18 includes four parallel horizontal rods 20, a pair 40 of inside vertical rods 22 and a pair 42 of outside vertical rods 22. Preferably, the pair 42 of outside vertical rods 22 are longer than the pair 40 of inside vertical rods 22. The tubes 24 are connected to the upper ends 28 of the pair 42 of outside vertical rods 40. The tubes 24 preferably comprise a C-shaped section 44 having a pair of curved arms 46 connected to ends of the C-shaped section 44. The tubes 24 are connected to the vertical rods 22 of the lower trellis section 18 by snapping the pair of curved arms 46 around the vertical rods 22 and welding the curved arms 46 to the vertical rods 22. The tubes 24 therefore define a closed periphery for the vertical rods 14 of the upper trellis section 12 inserted therein. It is contemplated that the tubes 24 could be circular tubes connected to the vertical rods 14.

The trellis assembly 10 allows for an infinite number of trellis configurations. The trellis assembly 10 includes at least one first trellis section and at least one second trellis section. Preferably, the second trellis section includes one of the lower trellis sections 18 described above and the first trellis section includes one of the lower trellis sections 18 or one of the upper trellis sections 12 described above.

A trellis is preferably constructed using the trellis assembly 10 by first placing one or more of the lower trellis sections 18 into the ground by inserting the lower ends of the pair 42 of outside vertical rods 22 (and possibly the lower ends of the pair 40 of inside vertical rods 22) into the ground. Thereafter, another lower trellis section 18 or an upper trellis section 12 is connected to the one or more lower trellis sections 18 in the ground by inserting the pair 42 of outside vertical rods 22 of the another lower trellis section 18 or the pair 34 of outside vertical rods 14 of the upper trellis section 12 into tubes 24 of one or more of the lower trellis sections 18 in the ground. Another row of trellis sections can be made in the same manner as lower trellis sections 18 were used to make the second row.

FIG. 1 illustrates a first configuration of the trellis assembly 10 wherein the trellis sections 12, 18 are staggered. In FIG. 1, three lower trellis sections 18 are inserted in the ground and spaced a distance equal to an upper trellis section 12. Two upper trellis sections, 12 are connected to the lower trellis sections 18, with each upper trellis section 12 being connected to two lower trellis sections 18. Each upper trellis sections 12 has a first one of the pair 34 of outside vertical rods 14 in one of the tubes 24 of a first one of the lower trellis sections 18 and a second one of the pair 34 of outside vertical rods 14 in one of the tubes 24 of a second one of the lower trellis sections 18.

Figure 6:
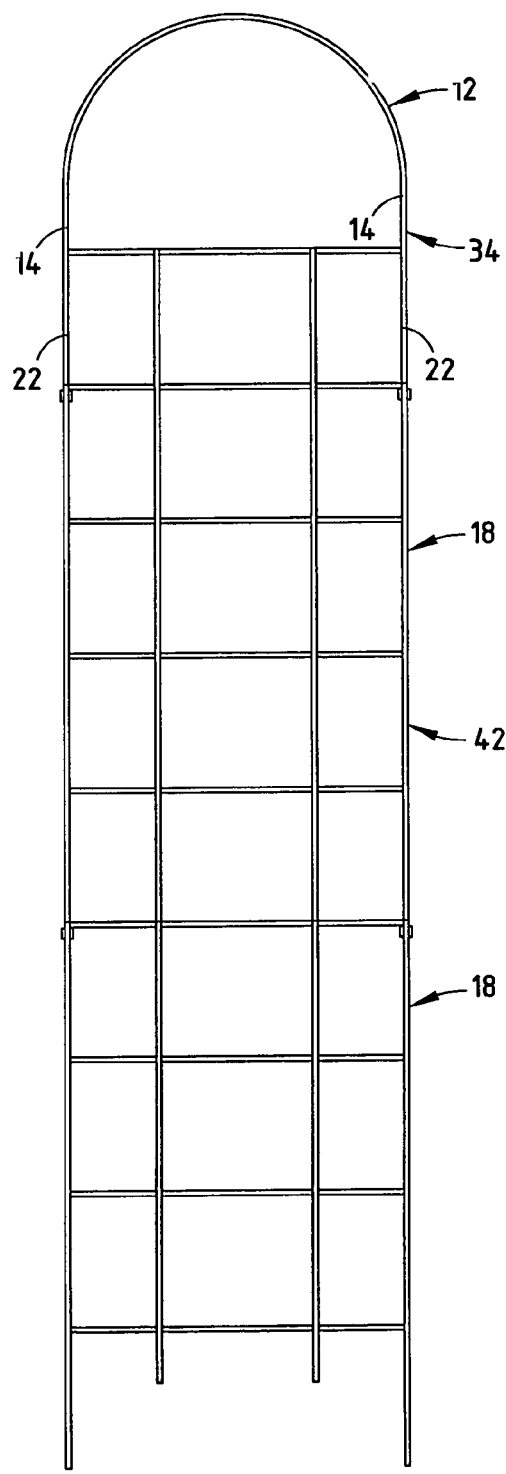
FIG. 6 is a front view of a second configuration for the trellis assembly.

FIG. 6 illustrates a second configuration of the trellis assembly 10 wherein the trellis sections are aligned vertically. In FIG. 6, the lower trellis section 18 is inserted in the ground and the pair 42 of outside vertical rods 22 of another lower trellis section 18 placed into the tubes 24 of the lower trellis section 18 in the ground to connect the lowest lower trellis section 18 to the second lowest trellis section 18. Additionally, the upper trellis section 12 is connected to the second lowest trellis section 18 by placing the pair 34 of outside vertical rods 14 of the upper trellis section 12 into the tubes 24 of the second lowest trellis section 18.

Figure 7:
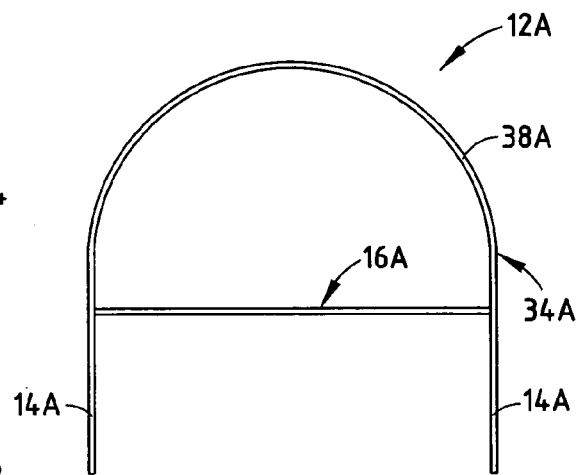
FIG. 7 is a front view of a second embodiment of the upper trellis section.

The reference numeral 12a (FIG. 7) generally designates another embodiment of the present invention, having a second embodiment for the upper trellis section. Since the upper trellis section 12a is similar to the previously described upper trellis section 12, similar parts appearing in FIG. 3 and FIG. 7, respectively, are represented by the same, corresponding reference number, except for the suffix "a" in the numerals of the latter. The second embodiment of the upper trellis section 12a includes one horizontal rod 16a and a pair 34a of outside vertical rods 14a. The pair 34a of outside vertical rods 14a are connected to each other by a curved rod 38a.

Figure 8:
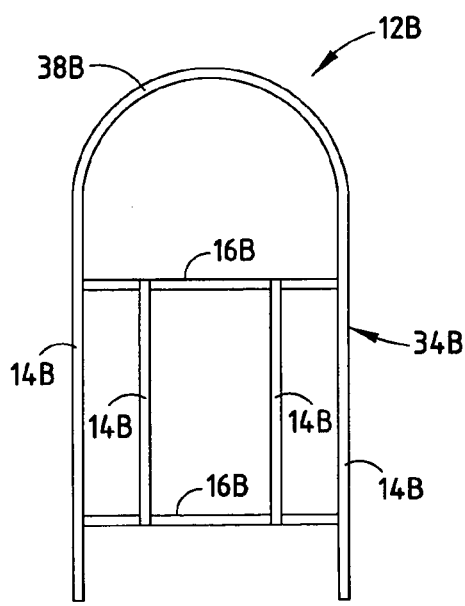
FIG. 8 is a front view of a third embodiment of the upper trellis section.

The reference numeral 12b (FIG. 8) generally designates another embodiment of the present invention, having a second embodiment for the upper trellis section. Since the upper trellis section 12b is similar to the previously described upper trellis section 12, similar parts appearing in FIG. 3 and FIG. 8, respectively, are represented by the same, corresponding reference number, except for the suffix "b" in the numerals of the latter. The second embodiment of the upper trellis section 12b includes two horizontal rods 16b and a pair 34b of outside vertical rods 14b. The pair 34b of outside vertical rods 14b are connected to each other by a curved rod 38b. The upper trellis section 12b also includes a pair 32 of inside vertical rods 14b extending between the two horizontal rods 16b.

In the forgoing description, it will be readily appreciated by those skilled in the art that modifications may be made to the invention without departing from the concepts disclosed herein. For example, the upper trellis sections 12 could each include a design connected to the top of the upper trellis section. Additionally, it is contemplated that the tubes 24 could be located on the higher trellis section instead of on a trellis section located below the higher trellis section. Such modifications are to be considered as included in the following claims, unless these claims by their language expressly state otherwise.

I claim:

1. A trellis assembly comprising:
a first trellis section having a plurality of vertical rods connected to at least one horizontal rod; and
a second trellis section having a plurality of connected horizontal and vertical rods;
wherein the second trellis section includes a plurality of tubes directly and permanently affixed to an outside of the vertical rods at ends thereof such that the tubes do not accept the vertical rods of the second trellis section therein, and the tubes are configured to accept ends of the vertical rods of the first trellis section to connect the first trellis section to the second trellis section; and
wherein the tubes comprise a C-shaped section and a curved arm connected to each end of the C-shaped section, each curved arm being directly connected to the vertical rods of the second trellis section.

2. A method of building a trellis comprising:
providing a first trellis section and a plurality of second trellis sections, the second trellis sections including a plurality of vertical rods and at least one horizonal rod, the second trellis sections further including a plurality of tubes directly and permanently affixed to an outside of the vertical rods at ends thereof such that the tubes do not accept the vertical rods of the second trellis section therein, the first trellis section including at least one pair of vertical rods and at least one horizonal rod;
inserting a first one of the at least one pair of vertical rods of the first trellis section into one of the tubes of a first one of the second trellis sections; and
inserting a second one of the at least one pair of vertical rods of the first trellis section into one of the tubes of a second one of the second trellis sections;
wherein the tubes comprise a C-shaped section and a curved arm connected to each end of the C-shaped section, each curved arm being directly connected to the vertical rods of the second trellis section.

3. A trellis assembly comprising:
a first trellis section having a plurality of vertical rods connected to at least one horizontal rod; and
a second trellis section having a plurality of connected horizontal and vertical rods;
wherein the second trellis section includes a plurality of tubes directly and permanently affixed to an outside of the vertical rods at ends thereof such that the tubes do not accept the vertical rods of the second trellis section therein, and the tubes are configured to accept ends of the vertical rods of the first trellis section to connect the first trellis section to the second trellis section; and
wherein the tubes comprise a C-shaped section and a curved arm connected to each end of the C-shaped section, each curved arm being directly and permanently affixed to the vertical rods of the second trellis section to define a closed periphery.

4. The trellis assembly of claim 3, wherein:
the plurality of vertical rods of the first trellis section includes at least one pair of vertical rods connected by a curved rod.

5. The trellis assembly of claim 4, wherein:
the at least one pair of vertical rods comprises two pairs of vertical rods.

6. The trellis assembly of claim 5, wherein:
the two pairs of vertical rods comprise a pair of outside vertical rods and a pair of inside vertical rods, the pair of outside vertical rods having an outside length longer than an inside length of the pair of inside vertical rods.

7. The trellis assembly of claim 3, wherein:
the at least one horizontal rod of the first trellis section comprises two horizontal rods.

8. The trellis assembly of claim 3, wherein:
the plurality of vertical rods of the second trellis section comprise a pair of inside vertical rods and a pair of outside vertical rods.

9. The trellis assembly of claim 8, wherein:
the pair of outside vertical rods have an outside length longer than an inside length of the pair of inside vertical rods.

10. The trellis assembly of claim 3, further including:
a third trellis section having a plurality of connected horizontal and vertical rods;
wherein the third trellis section includes a plurality of tubes directly affixed to an outside of the vertical rods at upper ends thereof configured to accept lower ends of the vertical rods of the second trellis section to connect the second trellis section to the third trellis section.

* * * * *